(12) United States Patent (10) Patent No.: US 12,658,966 B1
Xu (45) Date of Patent: Jun. 16, 2026

(54) PROTECTION APPARATUS FOR WIRELESS POSITIONING DEVICE

(71) Applicant: HANGZHOU MANYUE E-COMMERCE CO., LTD., Hangzhou (CN)

(72) Inventor: Han Jie Xu, Hangzhou (CN)

(73) Assignee: HANGZHOU MANYUE E-COMMERCE CO., LTD., Hangzhou (CN)

( * ) Notice: Subject to any disclaimer, the term of this patent is extended or adjusted under 35 U.S.C. 154(b) by 0 days.

(21) Appl. No.: 19/359,753

(22) Filed: Oct. 16, 2025

(30) Foreign Application Priority Data

Sep. 28, 2025 (CN) ......................... 202522114323.X

(51) Int. Cl.
*H04B 1/3888* (2015.01)
(52) U.S. Cl.
CPC ................................. *H04B 1/3888* (2013.01)
(58) Field of Classification Search
CPC ...... H04M 1/026; H04M 1/04; H04M 1/0283; H04M 1/7246; H04M 1/022; H04M 1/0254; H04M 1/0247; H04M 2250/02; H04M 1/6075; H04M 1/0243; H04M 1/0203; H04M 1/0239; H04M 1/0258
See application file for complete search history.

(56) References Cited

U.S. PATENT DOCUMENTS

| | | | | |
|---|---|---|---|---|
| 8,413,357 B1* | 4/2013 | Hagen | ..................... | G09F 3/207 |
| | | | | 40/303 |
| 2006/0087440 A1* | 4/2006 | Klein | ......................... | G09F 3/14 |
| | | | | 340/573.3 |
| 2014/0283424 A1* | 9/2014 | Cope | ..................... | A01K 11/00 |
| | | | | 40/303 |
| 2023/0092912 A1* | 3/2023 | Grice | ......................... | G09F 3/20 |
| | | | | 340/573.3 |
| 2024/0254809 A1* | 8/2024 | Wright | ................... | F16M 13/04 |

* cited by examiner

*Primary Examiner* — Kwasi Karikari

(57) ABSTRACT

The present application discloses a protection apparatus for a wireless positioning device, which includes a protection element, the protection element including: a first protection element including a first body, an internal space, and an opening portion; where the first body encloses to define the internal space for accommodating the wireless positioning device, with one side in an axial direction of the first body being closed and the other side forming the opening portion for inserting the wireless positioning device, and the opening portion is in communication with the internal space in the axial direction of the first body; the second protection element is used to close the opening portion to seal the internal space, where clamping fixation is formed between an outer periphery of the second protection element and an inner periphery of the opening portion. The present application simplifies the installation and disassembly operations and improves the usability.

18 Claims, 7 Drawing Sheets

PROTECTION APPARATUS FOR WIRELESS POSITIONING DEVICE

CROSS REFERENCE TO RELATED APPLICATION

The present application claims priority of Chinese Patent Application No. 202522114323.X filed on Sep. 28, 2025, the entire contents of which are hereby incorporated by reference.

TECHNICAL FIELD

The present application relates to the technical field of tracking and Positioning devices, particularly to a protection apparatus for a wireless positioning device.

BACKGROUND ART

With the widespread application of intelligent tracking devices, Air Tag, as a commonly used item tracking tool, has made its matching protective case an indispensable accessory for daily use, primarily providing drop, scratch, and portable protection for the Air Tag. At present, the Air Tag protective cases on the market typically employ an installation method where upper and lower shells are screwed together to encapsulate and secure the Air Tag. This installation structure presents significant operational inconveniences during actual use. Specifically, when installing the Air Tag, the user needs to place the Air Tag inside the lower shell, align the upper shell with the lower shell, and perform a plurality of rotational operations until the upper and lower shells are completely screwed together via threads. The entire installation process is time-consuming and involves cumbersome steps, resulting in a poor overall user experience. Therefore, there is an urgent need for an Air Tag protective case structure that is easy to install and simple to operate to address the deficiencies in the existing technology.

SUMMARY OF THE INVENTION

The embodiments of the present application provide a protection apparatus for a wireless positioning device, aiming to address the issues of cumbersome installation operations and operational inconveniences associated with existing Air Tag protective cases.

In a first aspect, the present application provides a protection apparatus for a wireless positioning device including:

a first protection element comprising a first body, an internal space, and an opening portion; wherein the first body encloses to define the internal space for accommodating the wireless positioning device, with one side in an axial direction of the first body being closed and the other side forming the opening portion for inserting the wireless positioning device, and the opening portion is in communication with the internal space in the axial direction of the first body;

a second protection element configured to close the opening portion to seal the internal space;

wherein clamping fixation is formed between an outer periphery of the second protection element and an inner periphery of the opening portion.

The present application provides a protection apparatus for a wireless positioning device including: a first protection element and a second protection element; the first protection element has a first body, an internal space, and an opening portion; the first body encloses to form the internal space for accommodating a wireless positioning device, with one side in the axial direction being a closed structure and the other side forming an opening portion for inserting the wireless positioning device; the opening portion is in communication with the internal space in the axial direction of the first body; the second protection element is configured to close the opening portion to seal the internal space, and clamping fixation is formed between the outer periphery of the second protection element and the inner periphery of the opening portion. The present application replaces the traditional threaded rotational locking structure with a clamping fixation method, simplifying the installation and removal operations of the wireless positioning device, shortening the operation time, and enhancing usability.

BRIEF DESCRIPTION OF THE DRAWINGS

To more clearly illustrate the technical solutions of the embodiments of the present application, the drawings to be used in the description of the embodiments will be briefly introduced below. Obviously, the drawings in the following description show only some embodiments of the present application, and a person skilled in the art may obtain other drawings based on these drawings without creative efforts.

REFERENCE NUMERALS

Figure 1:
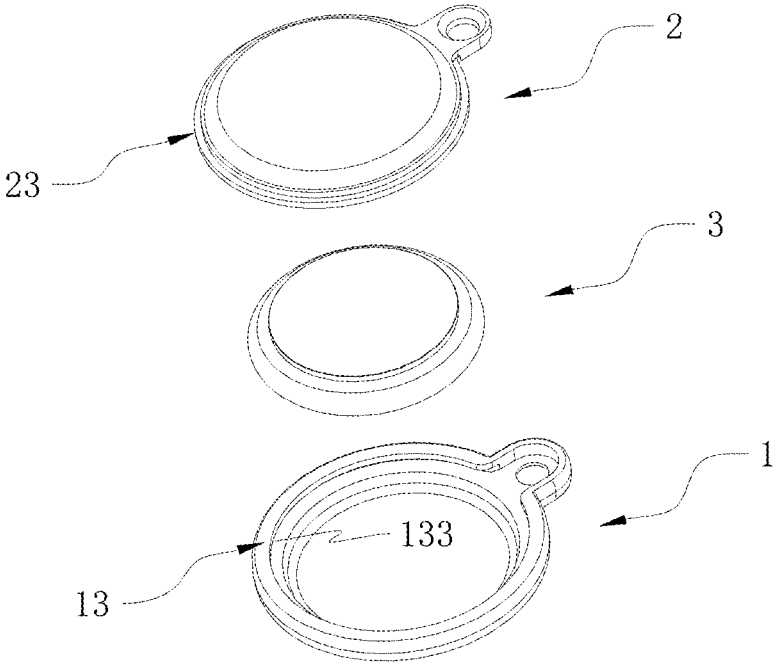
FIG. 1 illustrates an exploded view of a protection apparatus for a wireless positioning device according to an embodiment of the present application.

1. first protection element; 11. first body; 12. internal space; 13. opening portion; 131. skirt edge; 132. opening; 133. inner periphery; 134. annular groove; 14. first attachment portion; 141. first hanging hole; 142. locating receiving groove; 143. first arc-shaped connecting wall; 2. second protection element; 21. second body; 22. second attachment portion; 221. second hanging hole; 222. second arc-shaped connecting wall; 23. outer periphery; 231. annular boss; 232. annular step; 2321. first step surface; 2322. second step surface; 3. wireless positioning device.

DETAILED DESCRIPTION OF THE INVENTION

The technical solutions in the embodiments of the present application will be clearly and completely described below in conjunction with the accompanying drawings in the embodiments of the present application. Obviously, the described embodiments are only part of the embodiments of the present application, rather than all of the embodiments. Based on the embodiments in the present application, all other embodiments obtained by a person skilled in the art without creative efforts shall fall within the protection scope of the present application.

The directional terms mentioned in the present application, such as "upper," "lower," "front," "rear," "left," "right," "inner," "outer," "side," etc., are only used with reference to the orientation of the accompanying drawings. Therefore, the directional terms are used to describe and understand the present application but not to limit the present application. In addition, in the drawings, structures that are similar or identical are denoted by the same reference numerals.

As a widely used wireless positioning device, the AirTag requires a protective case as a key accessory to ensure its integrity and facilitate portability. At present, most AirTag protective cases on the market adopt an installation design where the upper and lower shells are screwed and locked through rotational alignment. During installation, users need to precisely align the upper and lower shells and rotate them a plurality of times to achieve locking. Similarly, when removing the AirTag, users must rotate it in the opposite direction a plurality of times to unlock it. The entire operation process is cumbersome and time-consuming, causing significant inconvenience for daily use. Therefore, there is an urgent need to improve the installation method to enhance operational convenience.

To address this issue, the present application provides a protection apparatus for a wireless positioning device that replaces the traditional threaded rotational locking structure with a clamping fixation method, simplifying the installation and removal operations of the wireless positioning device, shortening the operation time, and enhancing usability.

In order to better understand the above-mentioned technical solution, the following detailed description of the above-mentioned technical solution will be provided below with reference to the accompanying drawings and specific embodiments.

Referring to FIGS. 1 to 11, an embodiment of the present application shows a protection apparatus for a wireless positioning device 3, comprising: a first protection element 1 and a second protection element 2, the first protection element 1 includes a first body 11, an internal space 12, and an opening portion 13, the first body 11 encloses to define the internal space 12 for accommodating a wireless positioning device 3, with one side in an axial direction of the first body being closed, and the other side forming the opening portion 13 for inserting the wireless positioning device 3, and the opening portion 13 is in communication with the internal space 12 in the axial direction of the first body 11; the second protection element 2 is used to close the opening portion 13 to seal the internal space 12; where clamping fixation is formed between the outer periphery 23 of the second protection element 2 and the inner periphery 133 of the opening portion 13.

Specifically, the first protection element 1 serves as a primary load-bearing and protective structure for the wireless positioning device 3, comprising the first body 11, the internal space 12, and the opening portion 13. The first body 11 encloses to define the internal space 12 for accommodating the wireless positioning device 3. Specifically, the structural form of the first body 11 can be flexibly designed according to the shape of the wireless positioning device 3. For example, when the wireless positioning device 3 is circular, the first body 11 can form a cylindrical or elliptical internal space 12 by enclosing in a cylindrical shape. When the wireless positioning device 3 is square, the first body 11 can form a square-column internal space 12 by enclosing in a square shape. The inner wall contour of the first body 11 is adapted to the outer contour of the wireless positioning device 3 to ensure stability after insertion. One side of the first body 11 in the axial direction is closed, and this closed side can be connected to the first body 11 by integral molding to form a complete protective surface, which can specifically be in the shape of a plane, an arc, or an adaptive shape that fits the corresponding end face of the wireless positioning device 3. An opening portion 13 for placing the wireless positioning device 3 is formed at the other side of the first body 11 in the axial direction, the opening portion 13 is in communication with the internal space 12 in the axial direction of the first body 11, the cross-sectional shape of the opening portion 13 is consistent with that of the internal space 12, and the size of the opening portion can be slightly larger than the corresponding size of the wireless positioning device 3 to facilitate smooth placement of the wireless positioning device 3; of course, the size of the opening portion can also be slightly smaller than the corresponding size of the wireless positioning device 3, and the wireless positioning device 3 can also be smoothly placed by deforming the flexible first protection element 1. Secondly, the second protection element 2 is used to close the opening portion 13 to seal the internal space 12. The overall shape of the second protection element 2 matches the shape of the opening portion 13. For example, when the opening portion 13 is circular, the second protection element 2 can be a circular sheet structure. When the opening portion 13 is square, the second protection element 2 can be a square sheet structure. The thickness of the second protection element 2 can be set according to protective requirements to ensure the sealing effect of the internal space 12 and its own structural strength. The first protection element 1 and the second protection element 2 are connected through clamping fixation, meaning that the clamping fixation is formed between the outer periphery 23 of the second protection element 2 and the inner periphery 133 of the opening portion 13. The specific implementation methods for this clamping fixation can be varied. For example, an annular protrusion can be set on the outer periphery 23 of the second protection element 2, and a corresponding annular groove 134 can be set on the inner periphery 133 of the opening portion 13. The annular protrusion and annular groove 134 engage to form the clamping fixation. Alternatively, the outer periphery 23 of the second protection element 2 and the inner periphery 133 of the opening portion 13 can be interference fitted for the clamping fixation. Elastic claws can also be set on the inner periphery 133 of the opening portion 13, with corresponding slots set on the outer periphery 23 of the second protection element 2, where the elastic claws engage into the slots to form the clamping fixation. Additionally, a plurality of evenly spaced protrusions can be set on the outer periphery 23 of the second protection element 2, with corresponding recesses set on the inner periphery 133 of the opening portion 13, where the protrusions are embedded into the recesses to form the clamping fixation.

Thus, through the above-mentioned structural design, the protection apparatus for the wireless positioning device 3 in the present embodiment can address the technical issue of cumbersome and inconvenient operation caused by the threaded rotational locking installation method used in the existing protective case for the wireless positioning device 3. This apparatus achieves clamping fixation between the second protection element 2 and the opening portion 13 of the first protection element 1, eliminating the need for a plurality of rotations. Simply aligning the second protection element 2 with the opening portion 13 and applying a certain pressure can complete the closure and fixation. During disassembly, only a reverse force needs to be applied to separate them, making the operation steps simple and quick. In this way, the installation and removal operation processes of the wireless positioning device 3 are simplified, improving user convenience. Simultaneously, the clamping fixation method quickly seals the internal space 12, ensuring stable protection of the wireless positioning device 3 and avoiding poor user experience caused by complex operations.

In an embodiment, at least one first engaging portion is provided on one of the outer periphery 23 of the second protection element 2 and the inner periphery 133 of the opening portion 13, and a second engaging portion is provided on the other; the first engaging portion and the second engaging portion are engaged and fixed. Specifically, the first engaging portion and the second engaging portion are key structures for achieving the clamping fixation. The first engaging portion can be set on the outer periphery 23 of the second protection element 2 or the inner periphery 133 of the opening portion 13, while the second engaging portion is correspondingly set on the other. The number of the first engaging portions and the second engaging portions is at least one set. Specifically, the structural form of the first engaging portion can be a protrusion, a lug, a claw, a slot, or a recess, among others. The second engaging portion is a structure adapted to the first engaging portion. For example, when the first engaging portion is a protrusion, the second engaging portion can be a corresponding slot. When the first engaging portion is an elastic claw, the second engaging portion can be a corresponding hole. Firstly, if the first engaging portion is provided on the outer periphery 23 of the second protection element 2, it may extend in the circumferential direction of the outer periphery 23 or be spaced apart for engaging with the second engaging portion on the inner periphery 133 of the opening portion 13; if the first engaging portion is provided on the inner periphery 133 of the opening portion 13, it may be arranged in the axial direction or the circumferential direction of the inner periphery 133 to match the second engaging portion on the outer periphery 23 of the second protection element 2. Secondly, the first engaging portion and the second engaging portion achieve the connection between the second protection element 2 and the opening portion 13 through engagement and fixation. During installation, the second protection element 2 is aligned with the opening portion 13, and pressure is applied to make the first engaging portion and the second engaging portion contact and engage. During disassembly, a reverse force is applied to separate them. Thus, by clarifying the setting methods and cooperation relationships of the engaging portions, the issue of insufficient cooperation stability caused by unclear clamping fixation structures is addressed, ensuring the reliability and convenience of the engagement operation. Simultaneously, diverse forms of engaging portions can adapt to different usage scenarios and processing requirements.

In an embodiment, at least one pair of the first engaging portions and the second engaging portions are provided; one pair of the first engaging portions is symmetrically distributed in the radial direction along one of the outer periphery 23 of the second protection element 2 and the inner periphery 133 of the opening portion 13; one pair of the second engaging portions is symmetrically distributed in the radial direction along the other of the outer periphery 23 of the second protection element 2 and the inner periphery 133 of the opening portion 13; one pair of the first engaging portions is engaged and fixed with one pair of the second engaging portions in a one-to-one correspondence. Specifically, a pair of first engaging portions and a pair of second engaging portions are respectively distributed in radial symmetry, wherein the pair of first engaging portions may be arranged on the outer periphery 23 of the second protection element 2, located opposite each other along its diameter, or arranged on the inner periphery 133 of the opening portion 13, also located opposite each other along the diameter; the pair of second engaging portions are correspondingly arranged on the other one, with their locations corresponding one-to-one with those of the first engaging portions. Specifically, the structures of the first engaging portion and the second engaging portion may employ a combination of protrusions and grooves, such as providing two cylindrical protrusions at radially symmetric locations on the outer periphery 23 of the second protection element 2, and providing two cylindrical grooves at corresponding locations on the inner periphery 133 of the opening portion 13; alternatively, a combination of claws and slots may be used, with two elastic claws provided at radially symmetric locations on the inner periphery 133 of the opening portion 13, and two slots provided at corresponding locations on the outer periphery 23 of the second protection element 2. Firstly, the radially symmetric distribution ensures uniform distribution of the engagement force in the circumferential direction, avoiding fitting tilt caused by unilateral force. Secondly, during installation, only the pair of first engaging portions on the second protection element 2 needs to be aligned with the pair of second engaging portions on the opening portion 13, and pressure can be applied to complete the engagement. No deliberate alignment is required during operation, improving installation efficiency. Thus, through the symmetrically distributed engaging portion design, the issue of unstable fixation caused by uneven distribution of engaging portions is addressed, enhancing the connection stability between the second protection element 2 and the opening portion 13. Simultaneously, the alignment operation during installation is simplified, improving usability.

In one embodiment, a plurality of first engaging portions and a plurality of second engaging portions are provided. The plurality of first engaging portions are evenly distributed along the circumference of one of either the outer periphery 23 of the second protection element 2 and the inner periphery 133 of the opening portion 13. The plurality of second engaging portions are evenly distributed along the circumference of the other one of either the outer periphery 23 of the second protection element 2 and the inner periphery 133 of the opening portion 13. The plurality of first engaging portions are respectively engaged and fixed with the plurality of second engaging portions in a one-to-one correspondence. Specifically, the plurality of first engaging portions and the plurality of second engaging portions are evenly distributed along the circumference, respectively.

The quantity of the plurality of first engaging portions can be set to 3, 4, or more as required, and they are distributed at equal angular intervals along the outer periphery 23 of the second protection element 2 or the inner periphery 133 of the opening portion 13. The plurality of second engaging portions are provided on the other one in the same quantity and at corresponding locations. Specifically, the structures of the first engaging portion and the second engaging portion can adopt various forms. For example, the plurality of first engaging portions are wedge-shaped protrusions evenly distributed along the circumference of the outer periphery 23 of the second protection element 2, and the plurality of second engaging portions are wedge-shaped grooves at corresponding locations on the inner periphery 133 of the opening portion 13. The wedge-shaped structure can enhance the anti-loosening effect after engagement. Alternatively, a combination of a plurality of hemispherical protrusions and hemispherical pits can be used, evenly distributed along the circumference to achieve multi-point engagement. Firstly, the plurality of engaging portions evenly distributed along the circumference result in a more balanced distribution of the acting force between the second protection element 2 and the opening portion 13, avoiding local stress concentration. Secondly, during installation, the plurality of engaging portions come into contact and engage simultaneously, improving the overall connection strength. During disassembly, the evenly distributed force application points make the separation operation more effort-saving. Further, a larger number of engagement points can enhance the impact resistance of the structure and prevent accidental loosening. Through this design, the problem of insufficient connection strength caused by an insufficient number or uneven distribution of engaging portions is solved. The overall stability of the protective apparatus is improved. At the same time, the multi-point even engagement makes the operation feel smoother and enhances the user experience.

Referring to FIGS. 1 to 7, in one embodiment, the first engaging portion is an engaging groove formed by recessing outward from the inner periphery 133 of the opening portion 13 in a radial direction of the first protection element 1; the second engaging portion is an engaging boss formed by protruding outward from the outer periphery of the second protection element 2 in the radial direction of the second protection element 2; the engaging boss is embedded in the engaging groove. Specifically, the first engaging portion is an engaging groove, which is formed by recessing outward from the inner periphery 133 of the opening portion 13 in the radial direction of the first protection element 1. The cross-sectional shape of the groove can be rectangular, trapezoidal, arc-shaped, or other suitable shapes to provide accommodation space for the second engaging portion. The second engaging portion is an engaging boss, which is formed by protruding outward from the outer periphery of the second protection element 2 in the radial direction of the second protection element 2. The shape of the boss matches that of the groove to ensure stable embedding. Specifically, the depth of the engaging groove and the height of the engaging boss can be set according to the connection requirements to balance the connection strength and operational convenience. Firstly, the engaging groove is integrally formed with the inner periphery 133 of the opening portion 13 and can be continuously or intermittently distributed along the circumference of the inner periphery 133. The engaging boss is integrally formed with the outer periphery 23 of the second protection element 2, and the location of the engaging boss corresponds to that of the engaging groove in a one-to-one correspondence. Secondly, when installing the second protection element 2, the engaging boss is aligned with the engaging groove and apply axial pressure so that the boss can be embedded into the groove to form a fixation; during disassembly, a reverse force is applied to detach the boss from the groove. In this way, through the nesting structure of the boss and the groove, the specific form of engagement fixation is clarified. The problem of poor mating stability caused by an unclear engagement structure is solved, ensuring reliable connection and simple operation. At the same time, the boss-groove mating structure is easy to manufacture and adapts to the needs of mass production.

Figure 6A:
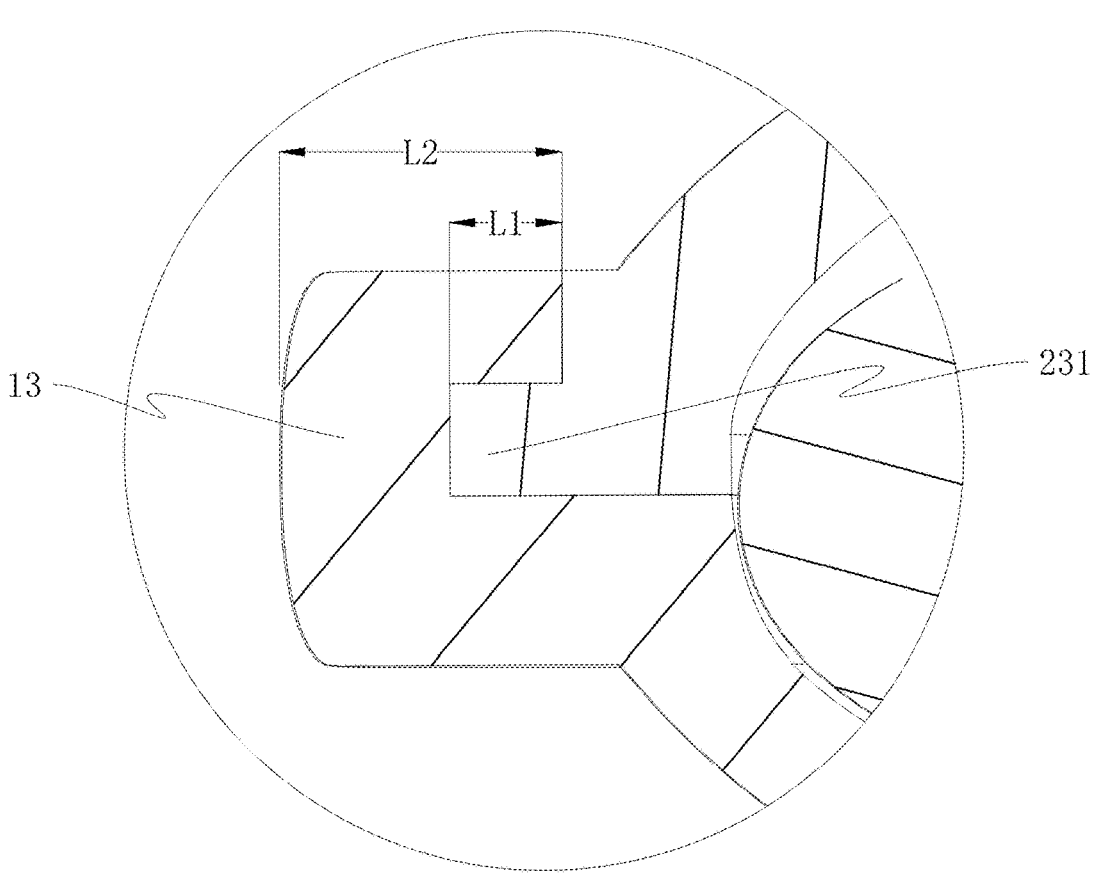
FIGS. 6A and 6B show enlarged views of Part A in FIG. 5.
Figure 6B:
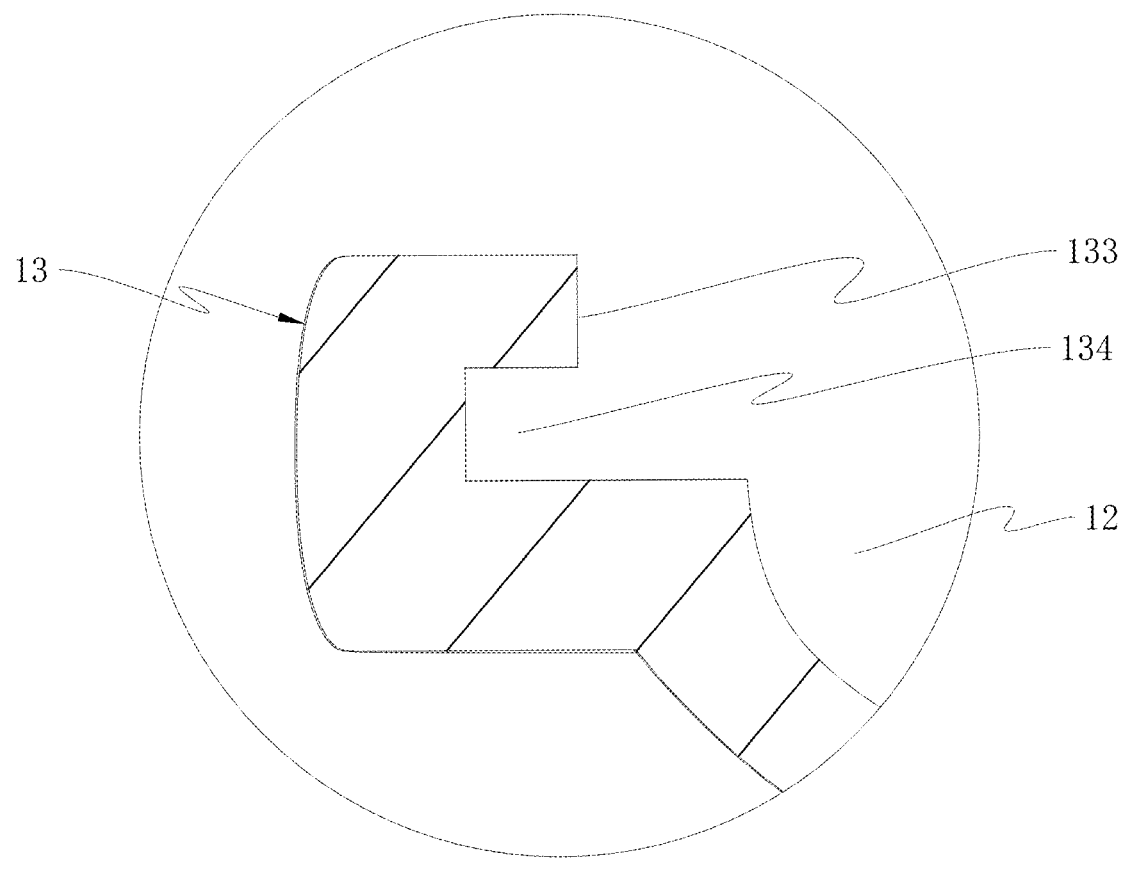

Referring to FIGS. 6A and 6B, in the present embodiment, the engaging groove is an annular groove 134 encircling the inner periphery 133 of the opening portion 13. The engaging boss is an annular boss 231 encircling the outer periphery 23 of the second protection element 2. The annular boss 231 is embedded in the annular groove 134. Specifically, the engaging groove is an annular groove 134 encircling the inner periphery 133 of the opening portion 13 and continuously extends along the circumference of the inner periphery 133 to form a closed loop. The cross-section of the groove can be U-shaped, V-shaped, or rectangular, etc. The engaging boss is an annular boss 231 encircling the outer periphery 23 of the second protection element 2 and also continuously extends along the circumference of the outer periphery 23 to form a closed loop. The cross-sectional shape of the boss matches that of the annular groove 134. Specifically, the annular groove 134 is coaxially arranged with the inner periphery 133 of the opening portion 13, and the annular boss 231 is coaxially arranged with the second protection element 2 to ensure quick alignment during installation. Firstly, the width and depth of the annular groove 134 can be adjusted according to the thickness of the second protection element 2 and the required connection strength. The width and height of the annular boss 231 match those of the groove. Secondly, during installation, it is only necessary to align the annular boss 231 of the second protection element 2 with the annular groove 134 of the opening portion 13 and press it in the axial direction to achieve uniform engagement around the entire circumference; during disassembly, an axial pulling force can be applied to disengage the boss from the groove. Thus, the annular boss-groove mating enables a full-circumference closed engagement structure between the second protection element 2 and the opening portion 13, solving the problem of uneven force caused by local engagement. It enhances the sealing and stability of the overall connection. At the same time, the full-circumference engagement structure design eliminates the need for deliberate alignment during installation, further improving operational convenience.

Referring to FIG. 6A, further, a radial width of the annular boss 231 is L1, and a width of the opening portion 13 is L2, wherein $15\% \leq L1/L2 \leq 85\%$. Specifically, the radial width of the annular boss 231 is L1, and a width of the opening portion 13 is L2, wherein a ratio of L1 to L2 is between 15% and 85%. Specifically, the setting of this ratio range can be adjusted according to the overall size, material, and usage scenario of the protective apparatus. For example, when the device size is small, a relatively small ratio can be selected to ensure a lightweight structure. When a higher connection strength is required, a relatively large ratio can be selected to increase the contact area. Firstly, when L1 is too small, the structural strength of the annular boss 231 may be insufficient and prone to deformation during repeated disassembly and assembly. When L1 is too large, it may lead to a decrease in the structural strength of the opening portion 13 or increase the disassembly difficulty. Secondly, the annular boss 231 and the opening portion 13 within this ratio range can not only ensure that the boss has sufficient structural strength for stable engagement but also avoid operational difficulties caused by an excessively wide boss. Through this ratio design, the problem of insufficient structural strength or operational inconvenience caused by an inappropriate width ratio between the annular boss 231 and the opening portion 13 is solved. It ensures reliable connection while maintaining a good disassembly and assembly feel, adapting to different usage requirements.

Figure 4:
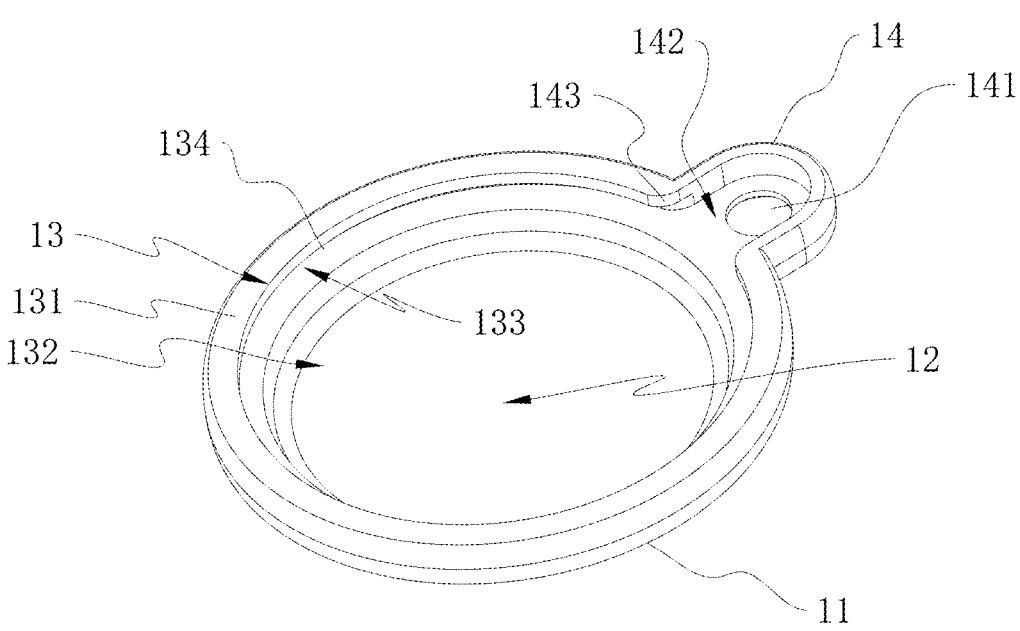
FIG. 4 shows a schematic view of a first protection element of a protection apparatus for a wireless positioning device according to an embodiment of the present application.
Figure 5:
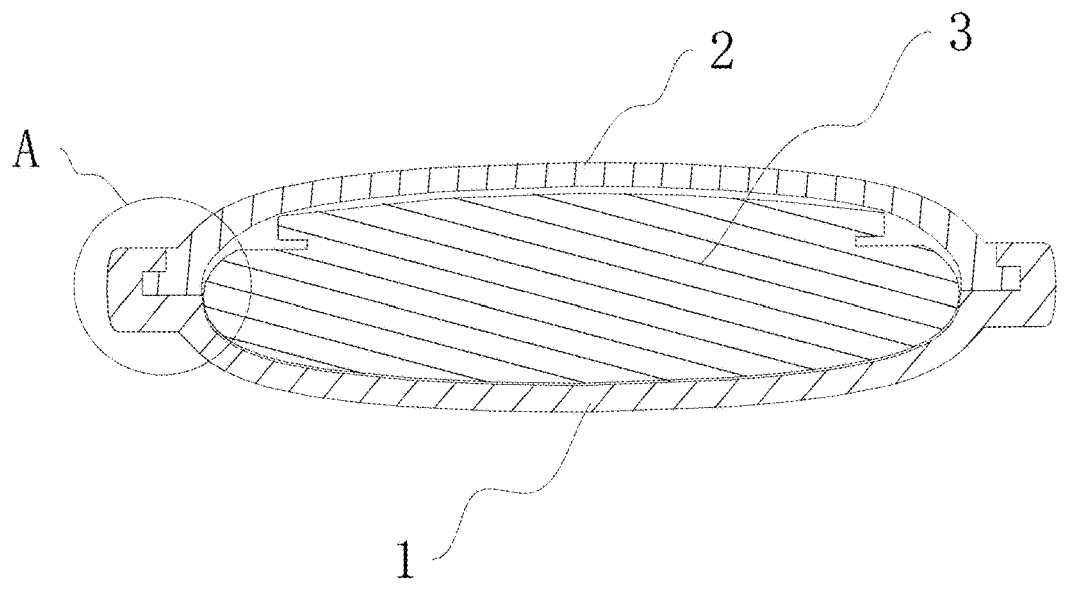
FIG. 5 illustrates a cross-sectional schematic view of a protection apparatus for a wireless positioning device according to an embodiment of the present application.

Referring to FIG. 4, in the present embodiment, the opening portion 13 includes a skirt edge 131 and an opening 132. The skirt edge 131 encircles the periphery of the first body 11. A diameter of the skirt edge 131 is slightly larger than that of the first body 11. An open area surrounded by the skirt edge 131 is the opening 132. Specifically, the opening portion 13 includes a skirt edge 131 and an opening 132. The skirt edge 131 encircles the periphery of the first body 11 and is integrally formed with the first body 11 or fixed by a connecting structure. The diameter of the skirt edge 131 is slightly larger than that of the first body 11, forming an outwardly extending edge structure. Its function is to enhance the structural strength of the opening portion 13 and provide locating and guidance for the installation of the second protection element 2. The open area surrounded by the skirt edge 131 is the opening 132. The shape of the opening 132 is consistent with that of the internal space 12 enclosed by the first body 11 and is used for placing or removing the wireless positioning device 3. Specifically, the axial length of the skirt edge 131 can be set as required, and its inner wall can be kept smooth or provided with a structure that matches the second protection element 2; the size of the opening 132 is slightly larger than the maximum size of the wireless positioning device 3, ensuring that the device can pass through smoothly. Firstly, a rounded transition can be set at the connection between the skirt edge 131 and the first body 11 to reduce stress concentration. Secondly, when installing the second protection element 2, the inner wall of the skirt edge 131 can guide the second protection element 2 to align precisely, so that the outer periphery 23 of the second protection element 2 can smoothly mate with the inner periphery 133 of the opening portion 13. Thus, through the design of the skirt edge 131, the problems of insufficient edge strength of the opening portion 13 or difficult alignment during the installation of the second protection element 2 are solved. It enhances the overall structural stability of the opening portion 13, simplifies the installation operation of the second protection element 2, and improves the assembly efficiency.

In another embodiment, the engaging groove is an arc-shaped groove formed by extending along the circumference of the inner periphery 133 of the opening portion 13. The engaging boss is an arc-shaped boss formed by extending along the circumference of the outer periphery 23 of the second protection element 2. The arc-shaped boss is embedded in the arc-shaped groove. Specifically, the engaging groove is an arc-shaped groove, which is formed by extending along the circumference of the inner periphery 133 of the opening portion 13. The extension angle can be set as required, such as 30 degrees, 60 degrees, 90 degrees, 180 degrees, or other angles. The cross-sectional shape of the groove can be arc-shaped, trapezoidal, etc. The engaging boss is an arc-shaped boss, which is formed by extending along the circumference of the outer periphery 23 of the second protection element 2. The extension angle is the same as that of the arc-shaped groove, and the shape matches that of the groove. Specifically, the arc-shaped groove and the arc-shaped boss can be provided as one set or a plurality of sets. When a plurality of sets are provided, they are intermittently distributed along the circumference. Firstly, the length and depth of the arc-shaped groove can be adjusted according to the required engagement strength, and the length and height of the arc-shaped boss correspond to and match those of the groove. Secondly, during installation, the arc-shaped boss is aligned with the arc-shaped groove, and pressure is applied so that the boss can be embedded in the groove to form a local engagement fixation. During disassembly, a reverse force is applied to separate them. Further, the arc-shaped structure can disperse stress when subjected to force, reducing local wear. Through this design, the problems of complex processing or excessive material consumption of the full-circumference engagement structure are solved. While ensuring sufficient connection strength, the processing technology is simplified, and the production cost is reduced. At the same time, the local engagement form makes the acting force during disassembly and assembly more concentrated and the operation more effort-saving.

Referring to FIGS. 8 to 11, in one embodiment, the second engaging portion is an annular step 232 encircling the outer periphery 23 of the second protection element 2. The annular step 232 includes a first step surface 2321 and a second step surface 2322. The first step surface 2321 is arranged in the axial direction of the second protection element 2. The second step surface 2322 is arranged in the radial direction of the second protection element 2. The second step surface 2322 is perpendicularly connected to the side of the first step surface 2321 close to the internal space 12. The first step surface 2321 is in close contact with the inner periphery 133 of the opening portion 13. The second step surface 2322 is in the internal space 12 and is in close contact with the inner sidewall at the top of the first protection element 1. Specifically, the second engaging portion is an annular step 232 encircling the outer periphery 23 of the second protection element 2 and is integrally formed with the second protection element 2, presenting a closed loop structure. The annular step 232 includes a first step surface 2321 and a second step surface 2322. The first step surface 2321 is arranged in the axial direction of the second protection element 2 and serves as the outer sidewall of the annular step 232. Its height can be adjusted according to the thickness of the second protection element 2 and the mating requirements. The second step surface 2322 is arranged in the radial direction of the second protection element 2 and is perpendicularly connected to the side of the first step surface 2321 close to the internal space 12, forming the inner supporting surface of the annular step 232. Specifically, when the second protection element 2 closes the opening portion 13, the first step surface 2321 is in close contact with the inner periphery 133 of the opening portion 13, and a surface-to-surface contact fit can be formed between them to ensure radial locating; the second step surface 2322 is located in the internal space 12 and is in close contact with the inner sidewall at the top of the first protection element 1, achieving axial locating. First, the outer peripheral contour of the first step surface 2321 is adapted to the inner peripheral contour of the opening portion 13 to ensure tight fitting; second, the radial width of the second step surface 2322 can be adjusted according to the structure of the inner sidewall at the top of the first protection element 1 to achieve stable support. Thus, through the double-step surface design of the annular step 232, the multi-directional fitting relationship between the second protection element 2 and the opening portion 13 is clarified, addressing the issue of insufficient locating with a single engaging surface. This enables the second protection element 2 to be effectively fixed in both the radial and axial directions, enhancing the overall connection stability. Meanwhile, the surface-contact fitting also reduces local stress concentration, extending the structural service life.

In the present embodiment, when the wireless positioning device 3 is accommodated in the internal space 12, the upper surface of the wireless positioning device 3 abuts against a lower surface of the second protection element 2 to press the second step surface 2322 tightly against the inner sidewall at the top of the first protection element 1. Specifically, when the wireless positioning device 3 is accommodated in the internal space 12, its location corresponds to the lower surface of the second protection element 2, and the upper surface of the wireless positioning device 3 abuts against the lower surface of the second protection element 2. Specifically, after the wireless positioning device 3 is placed into the internal space 12 of the first protection element 1, its axial height matches the height of the internal space 12, enabling the top of the wireless positioning device 3 to be in contact with the lower surface of the second protection element 2. Firstly, when the second protection element 2 closes the opening portion 13 and mates with the opening portion 13 through the annular step 232, the wireless positioning device 3 generates an upward abutting force on the second protection element 2. Secondly, this abutting force presses the second step surface 2322 tightly against the inner sidewall at the top of the first protection element 1, further enhancing the tight fitting between them and avoiding looseness caused by gaps. Thus, by using the structure of the wireless positioning device 3 itself to form an auxiliary pressing effect, the problem of poor mating looseness that may exist when relying solely on the engagement structure is solved. It makes the connection between the second protection element 2 and the first protection element 1 more reliable. At the same time, there is no need to additionally set pressing components, simplifying the overall structural design and improving the integration and usage stability of the device.

Figure 8:
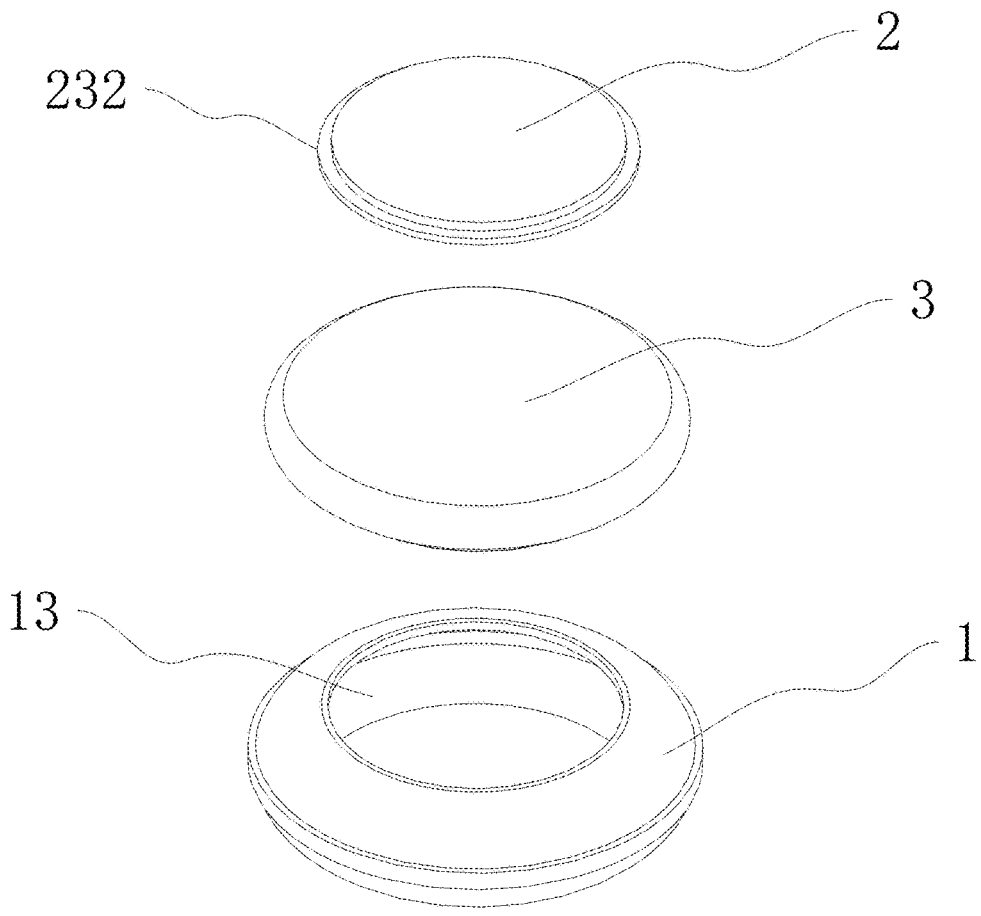
FIG. 8 illustrates another exploded view of a protection apparatus for a wireless positioning device according to an embodiment of the present application.
Figure 9:
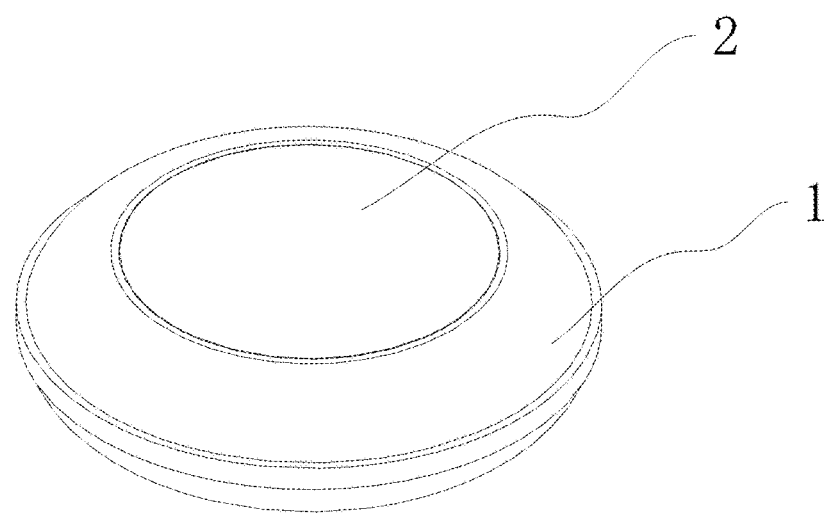
FIG. 9 illustrates another schematic view of a protection apparatus for a wireless positioning device according to an embodiment of the present application.
Figure 10:
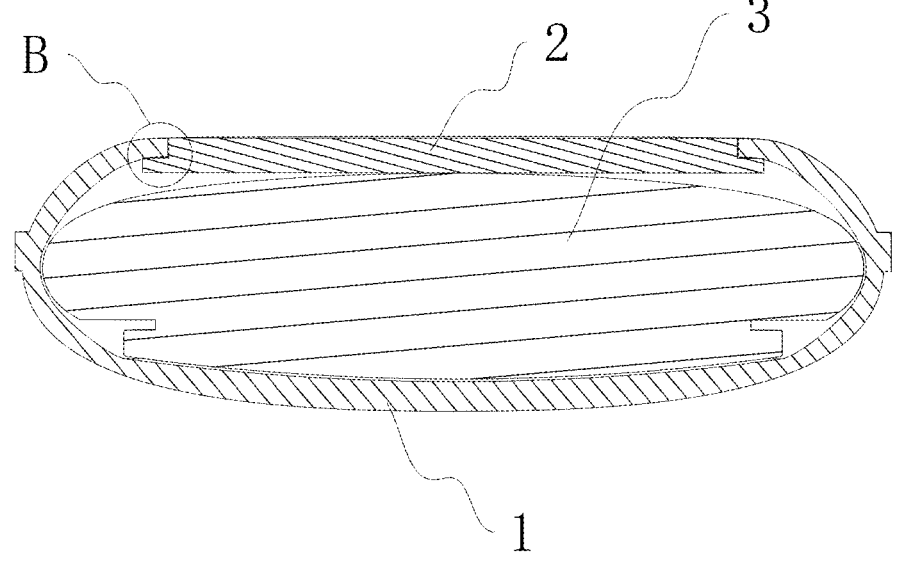
FIG. 10 illustrates a cross-sectional schematic view of a protection apparatus for a wireless positioning device according to an embodiment of the present application.
Figure 11:
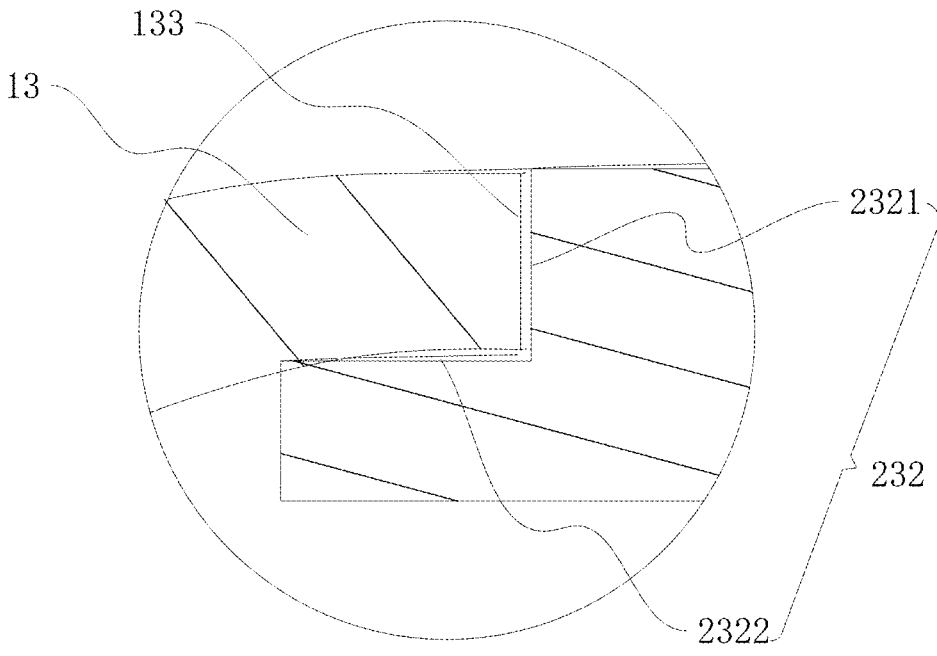
FIG. 11 illustrates an enlarged partial view B of FIG. 10.

Referring to FIG. 8, in the present embodiment, the opening portion 13 is a window formed by converging the periphery of the first body 11 towards its center. Specifically, the periphery of the first body 11 converges towards its center to form the opening portion 13. This converging structure is achieved through a specific construction method of the periphery of the first body 11, such as converging with a curved surface transition and using a smooth curve contour to naturally converge the periphery towards the center. Specifically, the opening portion 13 formed by this converging has adaptive guiding characteristics. Its converging angle can vary within a certain range to adapt to the wireless positioning devices 3 of different sizes. When the device is placed in, the converging periphery structure can automatically guide the device to slide into the central location of the internal space 12. At the same time, this structure forms a reinforced annular supporting area at the edge of the opening portion 13. After the device is placed in, the converging periphery structure closely fits the outer periphery of the device to achieve stable wrapping, significantly improving the structural strength of the first body 11 at the opening portion 13. Thus, the technical problems of the lack of self-centering function and insufficient edge strength of the opening portion 13 in traditional protective apparatuses are solved. The special construction of periphery converging simultaneously achieves the guiding function and structural reinforcement for device installation. Through the present embodiment, the installation process of the wireless positioning device 3 becomes more convenient and accurate, effectively preventing assembly difficulties caused by device deflection. At the same time, the converging structure enhances the anti-deformation ability of the edge of the opening portion 13, extends the service life of the protective apparatus, and optimizes the overall aesthetic appearance of the product through the streamlined converging contour.

In one embodiment, the first protection element 1 and/or the second protection element 2 is provided with attachment elements. Specifically, the attachment elements are provided on the first protection element 1 and/or the second protection element 2. Their function is to provide additional carrying or fixing methods for the protective apparatus, making it convenient for users to associate the device with other items. Specifically, the forms of the attachment elements can be diverse, such as hanging holes, hooks, buckles, magnetic structures, adhesive layers, etc. If provided on the first protection element 1, they can be located on the outer surface of the closed side, the outer periphery 23, or other suitable locations. If provided on the second protection element 2, they can be located on the outer surface or edge away from the internal space 12. Firstly, when only the first protection element 1 is provided with attachment elements, the overall suspension can be achieved through these elements. When only the second protection element 2 is provided with attachment elements, the carrying function can also be realized. When both are provided with attachment elements, the connection reliability can be enhanced or multifunctional carrying can be achieved through their cooperation. Secondly, the attachment elements can be integrally formed with the protection elements or connected in a detachable manner to adapt to different usage scenarios. By providing the attachment elements, the issue of a single carrying method for the protective apparatus is resolved, enhancing the portability and applicability of the device to meet users' diverse carrying needs.

Figure 3:
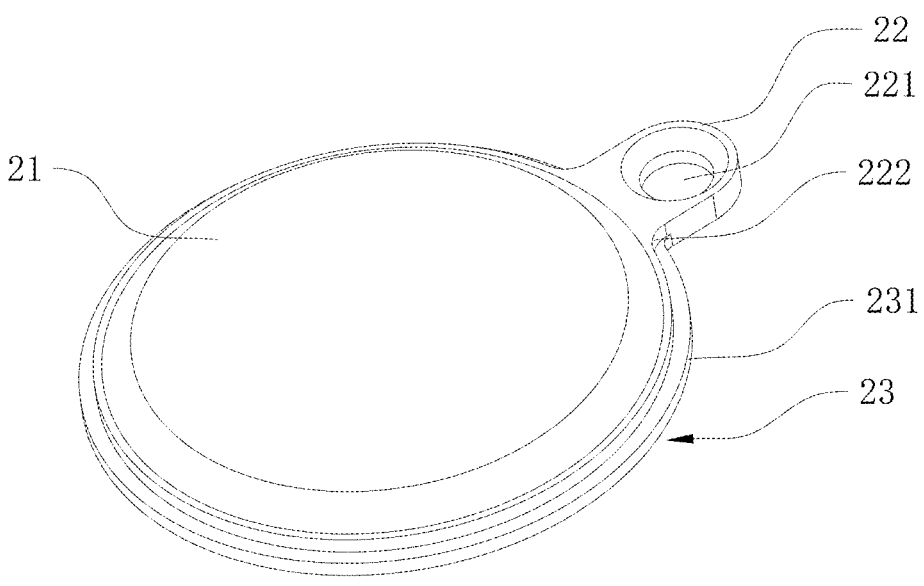
FIG. 3 illustrates a schematic view of a second protection element of a protection apparatus for a wireless positioning device according to an embodiment of the present application.

Referring to FIGS. 3 and 4, in the present embodiment, the first protection element 1 further includes a first attachment portion 14, which is provided in the radial direction of the first protection element 1 at the edge of the first body 11. A first hanging hole 141 is formed in the first attachment portion 14. The second protection element 2 includes a second body 21 and a second attachment portion 22, and the second attachment portion 22 is provided in the radial direction of the second protection element 2 at the edge of the second body 21. A second hanging hole 221 is formed in the second attachment portion 22. The first attachment portion 14 and the second attachment portion 22 are axially aligned so that the first hanging hole 141 coincides with the second hanging hole 221. Specifically, the first attachment portion 14 of the first protection element 1 is disposed in a radial direction of the first attachment portion at the edge of the first body 11 and may be integrally formed or fixedly connected with the first body 11. The first attachment portion 14 is provided with the first hanging hole 141, which may be circular, elliptical, or another regular shape, for threading connecting elements such as a lanyard or keychain. The second protection element 2 includes a second body 21 and a second attachment portion 22. The second attachment portion 22 is disposed in a radial direction of the second attachment portion at an edge of the second body 21 and may be integrally formed or fixedly connected with the second body 21. The second attachment portion 22 is provided with a second hanging hole 221, which has a shape compatible with that of the first hanging hole 141. Specifically, when the second protection element 2 closes the opening portion 13, the first attachment portion 14 and the second attachment portion 22 are axially aligned, meaning they overlap in the axial direction, so that the first hanging hole 141 coincides with the second hanging hole 221 to form a continuous through-hole. The shapes of the first attachment portion 14 and the second attachment portion 22 may both be sheet-like, block-like, or other suitable structures to ensure proper alignment and fit. The coinciding hanging hole design allows a connecting element to pass through both hanging holes simultaneously, keeping the first protection element 1 and the second protection element 2 relatively fixed during carrying. Thus, through the aligned design of the attachment portions and hanging holes, the issue of unstable connections that may arise from separately provided hanging holes is resolved, enhancing the overall structural coherence of the protective apparatus while providing a more stable connection point for carrying, thereby improving reliability during the carrying process.

Figure 2:
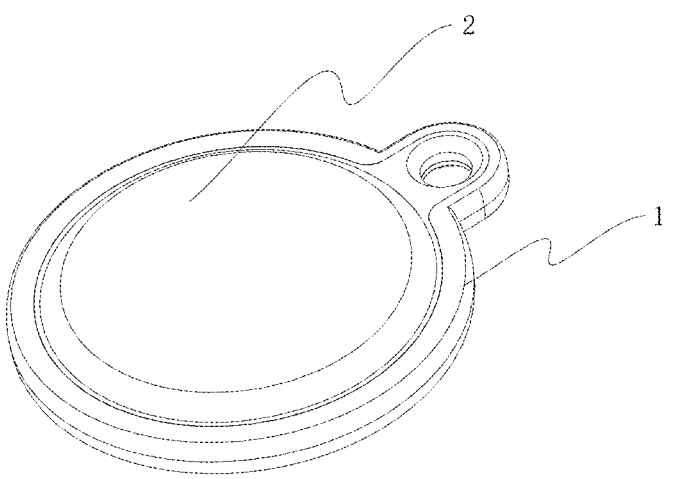
FIG. 2 illustrates a schematic view of a protection apparatus for a wireless positioning device according to an embodiment of the present application.

Referring to FIGS. 2 to 4, in the present embodiment, the first attachment portion 14 is recessed in the axial direction of the first protection element 1 to form a locating receiving groove 142. The locating receiving groove 142 is in communication with the internal space 12 in the radial direction of the first protection element 1, and the second attachment portion 22 is accommodated in the locating receiving groove 142. Specifically, the first attachment portion 14 is recessed in the axial direction of the first protection element 1 to form the locating receiving groove 142. The shape of this receiving groove is adapted to the shape of the second attachment portion 22, and its depth can be set according to the thickness of the second attachment portion 22. It is in communication with the internal space 12 in the radial direction of the first protection element 1, providing space for the placement of the second attachment portion 22. Specifically, when the second protection element 2 closes the opening portion 13, the second attachment portion 22 is precisely accommodated within the locating receiving groove 142, forming a tight nested fit between the two to prevent misalignment or gaps. Meanwhile, this nested structure also results in a smoother overall appearance of the protective apparatus, reducing inconvenience caused by protrusions during carrying. Firstly, the inner wall of the locating receiving groove 142 can be made smooth or provided with small protrusions and grooves to enhance fit stability. Secondly, since the first protection element 1 is a flexible structure, when it is necessary to disassemble the second protection element 2, the first attachment portion 14 can be pulled downwards through manual operation, utilizing flexible deformation to release the second attachment portion 22 from the nested fit within the locating receiving groove 142. At this point, the first attachment portion 14 and the second attachment portion 22 will form an open V-shaped configuration. This V-shaped configuration allows users to more easily grip the second attachment portion 22. By simply applying a slight force to grip and bend the second attachment portion 22 upward, the second protection element 2 can be quickly removed from the opening portion 13. Through the design of the locating receiving groove 142, not only is the issue of misalignment between the first attachment portion 14 and the second attachment portion 22 resolved, ensuring precise coincidence of the hanging holes and enhancing the stability of their connection, but also, by combining the flexible structure with the nested fit, the disassembly process is optimized, significantly improving the ease of assembly and disassembly of the device.

Continuing to refer to FIGS. 3 and 4, in specific implementation, a first arc-shaped connecting wall 143 is formed at a transitional connection between the inner periphery 133 of the opening portion 13 and the locating receiving groove 142. A second arc-shaped connecting wall 222 is formed at a transitional connection between the outer periphery 23 of the second body 21 and the second attachment portion 22. The arc surface curvature of the first arc-shaped connecting wall 143 matches that of the second arc-shaped connecting wall 222 so that the first arc-shaped connecting wall 143 is in contact with the second arc-shaped connecting wall 222. Specifically, the first arc-shaped connecting wall 143 is formed at the transitional connection between the inner periphery 133 of the opening portion 13 and the locating receiving groove 142. This arc-shaped wall curves smoothly along the transition, with a continuous and smooth arc surface. The second arc-shaped connecting wall 222 is formed at the transitional connection between the outer periphery 23 of the second body 21 and the second attachment portion 22, also curving smoothly. Specifically, the arc surface curvature of the first arc-shaped connecting wall 143 matches that of the second arc-shaped connecting wall 222. When the second attachment portion 22 is accommodated within the locating receiving groove 142, the two arc-shaped connecting walls can be completely in close contact, forming a continuous smooth transition surface. Firstly, the provision of arc-shaped connecting walls avoids the presence of right angles or sharp angles at the transitions, reducing stress concentration. Secondly, the curvature-matching design ensures a natural transition between the two components when connected, without obvious protrusions or depressions. Further, the closely fitting arc-shaped walls also enhance the connection seal between the first protection element 1 and the second protection element 2, preventing dust, moisture, etc., from entering the internal space 12 through the transitions. Through this arc-shaped connecting wall design, the issues of stress concentration or gaps caused by mismatched structures at the transitions are resolved, improving the structural strength and appearance integrity of the device while enhancing the protective effect on the internal equipment.

Further, the arc surface curvature of the first arc-shaped connecting wall 143 and the second arc-shaped connecting wall 222 ranges from 5% to 80%. Specifically, the first arc-shaped connecting wall 143 is formed at the transitional connection between the inner periphery 133 of the opening portion 13 and the locating receiving groove 142, with its arc surface curvature designed to be adjustable ranging from 5% to 80%. This arc-shaped connecting wall can adopt a continuously smoothly transitioning curved surface structure. The second arc-shaped connecting wall 222 is correspondingly formed at the transitional connection between the outer periphery 23 of the second body 21 and the second attachment portion 22, with its arc surface curvature matching that of the first arc-shaped connecting wall 143 and designed within the curvature range of from 5% to 80%. The curvature matching relationship between the two can be either identical curvature radii or curvature radii with a preset difference that still allows for a tight fit. Specifically, this curvature range design enables the first arc-shaped connecting wall 143 and the second arc-shaped connecting wall 222 to achieve varying degrees of tight fit. When a smaller curvature (e.g., 5%-20%) is used, a relatively gentle transitional connection can be formed, suitable for application scenarios with low requirements for assembly gaps. When a medium curvature (e.g., 20%-50%) is used, a moderate fit tightness can be achieved, balancing assembly convenience and connection stability. When a larger curvature (e.g., 50%-80%) is used, a tighter curved surface fit can be formed, suitable for use environments with high requirements for sealing and connection strength. Thus, the technical issue of assembly gaps or stress concentration that easily occurs at the connection parts of the protective apparatus is resolved. By optimizing the curvature matching relationship of the arc-shaped connecting walls, both the smoothness of the assembly process and the bonding strength and sealing performance of the connection parts are ensured. The present embodiment provides an adjustable curved surface connection solution, allowing the protective apparatus to flexibly select curvature parameters for the connecting walls according to different usage needs. While ensuring assembly accuracy, it effectively disperses stress at the connection parts, prolonging the product's service life. Moreover, the tight curved surface fit enhances the overall integrity and aesthetics of the protective apparatus.

Figure 7:
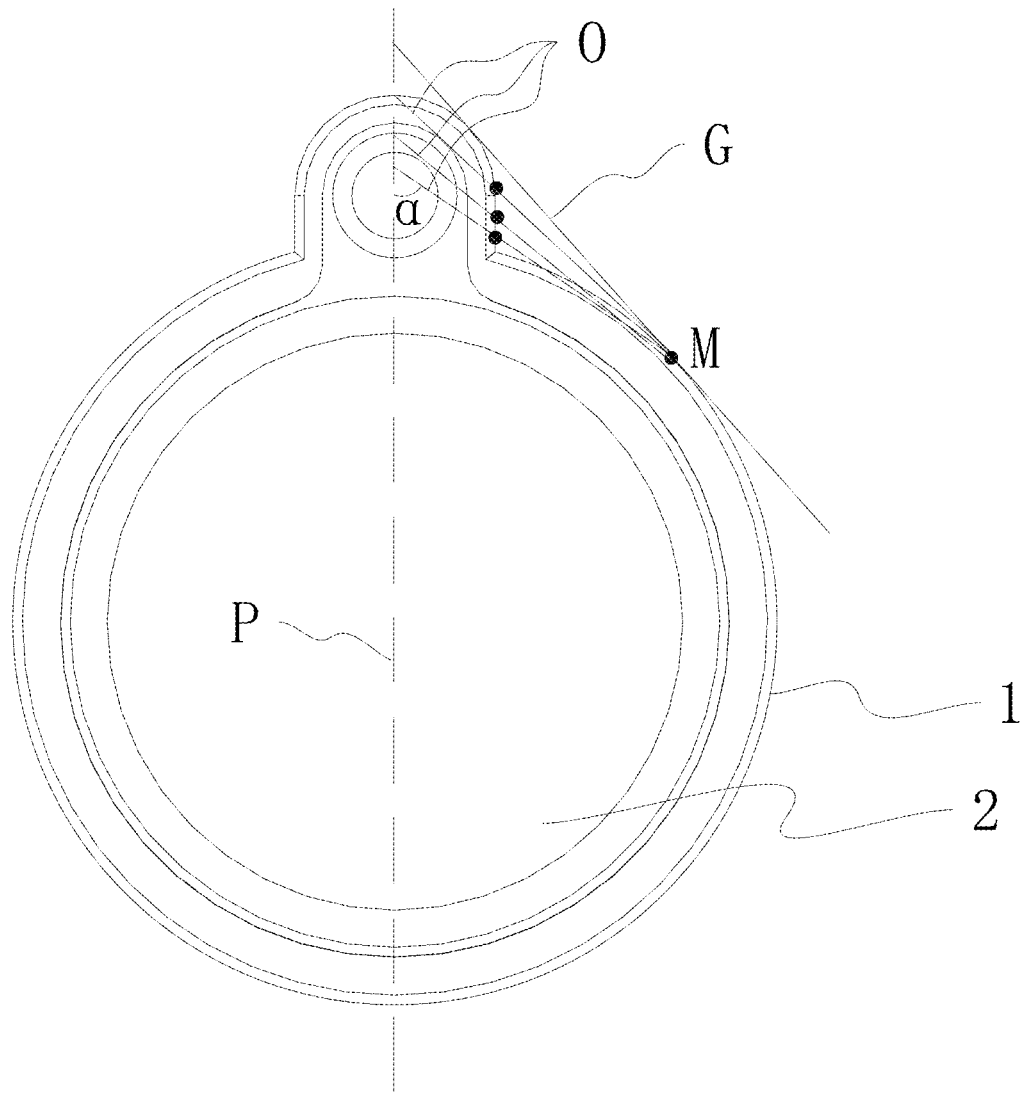
FIG. 7 illustrates a front schematic view of a protection apparatus for a wireless positioning device according to an embodiment of the present application.

Referring to FIG. 7, in the present embodiment, a first axis P is defined by a center of the first hanging hole 141 and a center of the first body 11. A common tangent G is defined by an outer edge of the first attachment portion 14 and the outer edge of the first body 11. A reference point M is defined as a tangent point of the first body 11 on the common tangent. A first connecting line O is defined as a line connecting a reference point and any point on the outer edge of the first attachment portion 14; wherein an angle a range formed between the first connecting line and the first axis ranges from 18° to 72°. Specifically, the center of the first hanging hole 141 and the center of the first body 11 define the first axis, which is the line connecting the center of the hanging hole and the center of the body. The outer edge of the first attachment portion 14 and the outer edge of the first body 11 define the common tangent, which is a straight-line tangent to both outer edges simultaneously. The tangent point of the first body 11 on the common tangent is defined as the reference point. The line connecting the reference point and any point on the outer edge of the first attachment portion 14 is defined as the first connecting line. Specifically, the included angle formed between the first connecting line and the first axis ranges from 18° to 72°, and the core function of this angle range is to define the size of the first attachment portion 14 to ensure that the attachment portion is neither too large nor too small. Firstly, if the included angle is too small, it means that the radial extension dimension of the first attachment portion 14 is too large, which will cause the attachment portion to protrude excessively from the first body 11. This not only affects the overall compactness and portability of the device but may also cause it to snag on other items during carrying. If the included angle is too large, it indicates that the radial extension dimension of the first attachment portion 14 is too small, which will result in insufficient structural strength of the attachment portion, making it difficult to withstand the tensile force during suspension and prone to breakage or damage. At the same time, it will also limit the space available for the first hanging hole 141, affecting the insertion and use of connecting elements. Secondly, a design within this angle enables the first attachment portion 14 to maintain an appropriate size, possessing sufficient structural strength to stably withstand the pulling force during suspension without excessive protrusion that affects portability. It also provides ample space for setting the first hanging hole 141, ensuring reliable realization of the carrying function. Through this angle limitation, the issues of structural defects or inconvenience in use caused by unreasonable attachment portion sizes are resolved. While ensuring structural reliability and carrying function, the compactness and practicality of the device are maintained.

In the present embodiment, the central axes of both the first body 11 and the second body 21 coincide, and both are radially symmetric about the central axis. Specifically, the central axes of both the first body 11 and the second body 21 coincide, meaning that they are coaxially arranged in the axial direction; and both are radially symmetric about this central axis, meaning that after being rotated by any angle around the central axis, their shapes coincide with themselves. Specifically, the radially symmetric structure of the first body 11 can manifest as circular, regular polygonal, etc., and the shape of the second body 21 is adapted to that of the first body 11, also possessing radial symmetry. Firstly, the coaxial arrangement ensures that when the second protection element 2 closes the opening portion 13, it can be precisely aligned with the first body 11, avoiding poor fitting caused by eccentricity. Secondly, the radially symmetric structure ensures uniform force distribution on the device in all directions, enhancing overall structural stability, while also facilitating manufacturing and reducing production difficulty. Further, the symmetric structure also improves the aesthetic appearance of the device, meeting users' aesthetic needs. Through this symmetric design, the issues of misalignment or uneven force distribution between the first body 11 and the second body 21 are resolved, ensuring fit accuracy and structural stability while simplifying the production process and improving product consistency.

In one embodiment, the first protection element 1 and/or the second protection element 2 adopt a flexible structure. The material can be silicone, rubber, flexible plastic, or other materials with elastic deformation capabilities, capable of deforming under external force and returning to their original shape after the force is removed. Specifically, if only the first protection element 1 is of a flexible structure, it can facilitate the insertion and removal of the wireless positioning device 3 through deformation and enhance cushioning protection for the device. If only the second protection element 2 is a flexible structure, it can form a tighter fit with the opening portion 13 through deformation, improving connection reliability. If both are flexible structures, they can comprehensively leverage these two advantages. Firstly, the deformation capability of the flexible structure makes installation and disassembly operations more effortless, allowing for fit without precise alignment. Secondly, the flexible material itself has good cushioning performance, capable of absorbing external impact forces and better protecting the internal wireless positioning device 3. Further, the flexible structure can also adapt to devices of different sizes, improving the device's versatility. Through the adoption of a flexible structure, the issues of inconvenient operation or limited protective effect of rigid structures are resolved, enhancing the device's ease of use and protective performance while increasing structural adaptability and durability.

The foregoing descriptions merely represent specific embodiments of the present application. However, the scope of protection sought by the present application is not limited thereto. Any person skilled in the relevant technical field may readily conceive of various equivalent modifications or substitutions within the technical scope disclosed in the present application. Such modifications or substitutions shall all fall within the protection scope of the present application. Accordingly, the protection scope of the present application shall be subject to the scope defined by the claims.

The invention claimed is:
1. A protection apparatus for a wireless positioning device, comprising:

a first protection element comprising a first body, an internal space, and an opening portion; wherein the first body encloses to define the internal space for accommodating the wireless positioning device, with one side in an axial direction of the first body being closed and the other side forming the opening portion for inserting the wireless positioning device, and the opening portion is in communication with the internal space in the axial direction of the first body;

a second protection element configured to close the opening portion to seal the internal space; wherein clamping fixation is formed between an outer periphery of the second protection element and an inner periphery of the opening portion;

wherein at least one first engaging portion is provided on one of the outer periphery of the second protection element and the inner periphery of the opening portion, and at least one second engaging portion is provided on the other; the first engaging portion and the at least one second engaging portion are engaged and fixed;

wherein the at least one second engaging portion is an annular step encircling the outer periphery of the second protection element; the annular step comprises a first step surface and a second step surface; the first step surface is arranged in the axial direction of the second protection element; the second step surface is arranged in the radial direction of the second protection element; the second step surface is perpendicularly connected to a side of the first step surface closer to the internal space; the first step surface is in close contact with the inner periphery of the opening portion; the second step surface is located within the internal space and in close contact with a top inner wall of the first protection element.

2. The protection apparatus for a wireless positioning device according to claim 1, wherein the at least one first engaging portion is an engaging groove formed by recessing outward from the inner periphery of the opening portion in a radial direction of the first protection element; the at least one second engaging portion is an engaging boss formed by protruding outward from the outer periphery of the second protection element in the radial direction of the second protection element; the engaging boss is embedded in the engaging groove.

3. The protection apparatus for a wireless positioning device according to claim 2, wherein the engaging groove is an annular groove encircling the inner periphery of the opening portion; the engaging boss is an annular boss encircling the outer periphery of the second protection element; the annular boss is embedded in the annular groove.

4. The protection apparatus for a wireless positioning device according to claim 3, wherein a radial width of the annular boss is L1, a width of the opening portion is L2, and 15%≤L1/L2≤85%.

5. The protection apparatus for a wireless positioning device according to claim 2, wherein the engaging groove is an arc-shaped groove extending circumferentially along the inner periphery of the opening portion; the engaging boss is an arc-shaped boss extending circumferentially along the outer periphery of the second protection element; the arc-shaped boss is embedded in the arc-shaped groove.

6. The protection apparatus for a wireless positioning device according to claim 1, wherein when the wireless positioning device is accommodated in the internal space, an upper surface of the wireless positioning device abuts against a lower surface of the second protection element to press the second step surface against the top inner wall of the first protection element.

7. The protection apparatus for a wireless positioning device according to claim 1, wherein at least one pair of the first engaging portions and at least one pair of the second engaging portions are provided; the at least one pair of the first engaging portions is symmetrically distributed in the radial direction along one of the outer periphery of the second protection element and the inner periphery of the opening portion; the at least one pair of the second engaging portions is symmetrically distributed in the radial direction along the other; the at least one pair of the first engaging portions is engaged and fixed with the at least one pair of the second engaging portions in a one-to-one correspondence.

8. The protection apparatus for a wireless positioning device according to claim 1, wherein the plurality of first engaging portions and the second engaging portions are provided; the plurality of the first engaging portions are uniformly distributed circumferentially along one of the outer periphery of the second protection element and the inner periphery of the opening portion; the plurality of the second engaging portions are uniformly distributed circumferentially along the other; the plurality of the first engaging portions are engaged and fixed with the plurality of the second engaging portions in a one-to-one correspondence.

9. The protection apparatus for a wireless positioning device according to claim 1, wherein a periphery of the first body converges toward a center of the first body to form the opening portion.

10. The protection apparatus for a wireless positioning device according to claim 1, wherein the opening portion comprises a skirt edge and an opening; the skirt edge encircles the periphery of the first body; a diameter of the skirt edge is slightly larger than that of the first body; an open area enclosed by the skirt edge is the opening.

11. The protection apparatus for a wireless positioning device according to claim 1, wherein the first protection element and/or the second protection element is of a flexible structure.

12. A protection apparatus for a wireless positioning device, comprising:

a first protection element comprising a first body, an internal space, and an opening portion; wherein the first body encloses to define the internal space for accommodating the wireless positioning device, with one side in an axial direction of the first body being closed and the other side forming the opening portion for inserting the wireless positioning device, and the opening portion is in communication with the internal space in the axial direction of the first body;

a second protection element configured to close the opening portion to seal the internal space; wherein clamping fixation is formed between an outer periphery of the second protection element and an inner periphery of the opening portion;

wherein the first protection element and/or the second protection element is provided with attachment elements;

wherein the first protection element further comprises a first attachment portion provided in the radial direction of the first protection element at an edge of the first body, a first hanging hole being formed in the first attachment portion, the second protection element comprising a second body and a second attachment portion provided in the radial direction of the second protection element at the edge of the second body, a second hanging hole being formed in the second attachment portion, and the first attachment portion and the second attachment portion being axially aligned so that the first hanging hole coincides with the second hanging hole.

13. The protection apparatus for a wireless positioning device according to claim 12, wherein a locating receiving groove is recessed in the axial direction of the first protection element on the first attachment portion; the locating receiving groove is in communication with the internal space in the radial direction of the first protection element, and the second attachment portion is accommodated in the locating receiving groove.

14. The protection apparatus for a wireless positioning device according to claim 13, wherein a first arc-shaped connecting wall is formed at a transitional connection between the inner periphery of the opening portion and the locating receiving groove; a second arc-shaped connecting wall is formed at a transitional connection between the outer periphery of the second body and the second attachment portion; a curvature of the arc surface of the first arc-shaped connecting wall matches that of the second arc-shaped connecting wall so that the first arc-shaped connecting wall is in close contact with the second arc-shaped connecting wall.

15. The protection apparatus for a wireless positioning device according to claim 14, wherein the curvature of the arc surfaces of the first arc-shaped connecting wall and the second arc-shaped connecting wall ranges from 5% to 80%.

16. The protection apparatus for a wireless positioning device according to claim 12, wherein a first axis is defined by a center of the first hanging hole and a center of the first body; a common tangent is defined by an outer edge of the first attachment portion and the outer edge of the first body; a reference point is defined as a tangent point of the first body on the common tangent; a first connecting line is defined as a line connecting a reference point and any point on the outer edge of the first attachment portion; wherein an angle formed between the first connecting line and the first axis ranges from 18° to 72°.

17. The protection apparatus for a wireless positioning device according to claim 12, wherein the central axes of both the first body and the second body coincide and both are radially symmetrical about the central axis.

18. A protection apparatus for a wireless positioning device, comprising:

a first protection element comprising a first body, an internal space, and an opening portion; wherein the first body encloses to define the internal space for accommodating the wireless positioning device, with one side in an axial direction of the first body being closed and the other side forming the opening portion for inserting the wireless positioning device, and the opening portion is in communication with the internal space in the axial direction of the first body;

a second protection element configured to close the opening portion to seal the internal space; wherein clamping fixation is formed between an outer periphery of the second protection element and an inner periphery of the opening portion;

wherein at least one pair of first engaging portions and at least one pair of second engaging portions are provided; the at least one pair of the first engaging portions is symmetrically distributed in the radial direction along one of the outer periphery of the second protection element and the inner periphery of the opening portion; the at least one pair of the second engaging portions is symmetrically distributed in the radial direction along the other; the at least one pair of the first engaging portions is engaged and fixed with the at least one pair of the second engaging portions in a one-to-one correspondence.

\* \* \* \* \*